Figure 1:
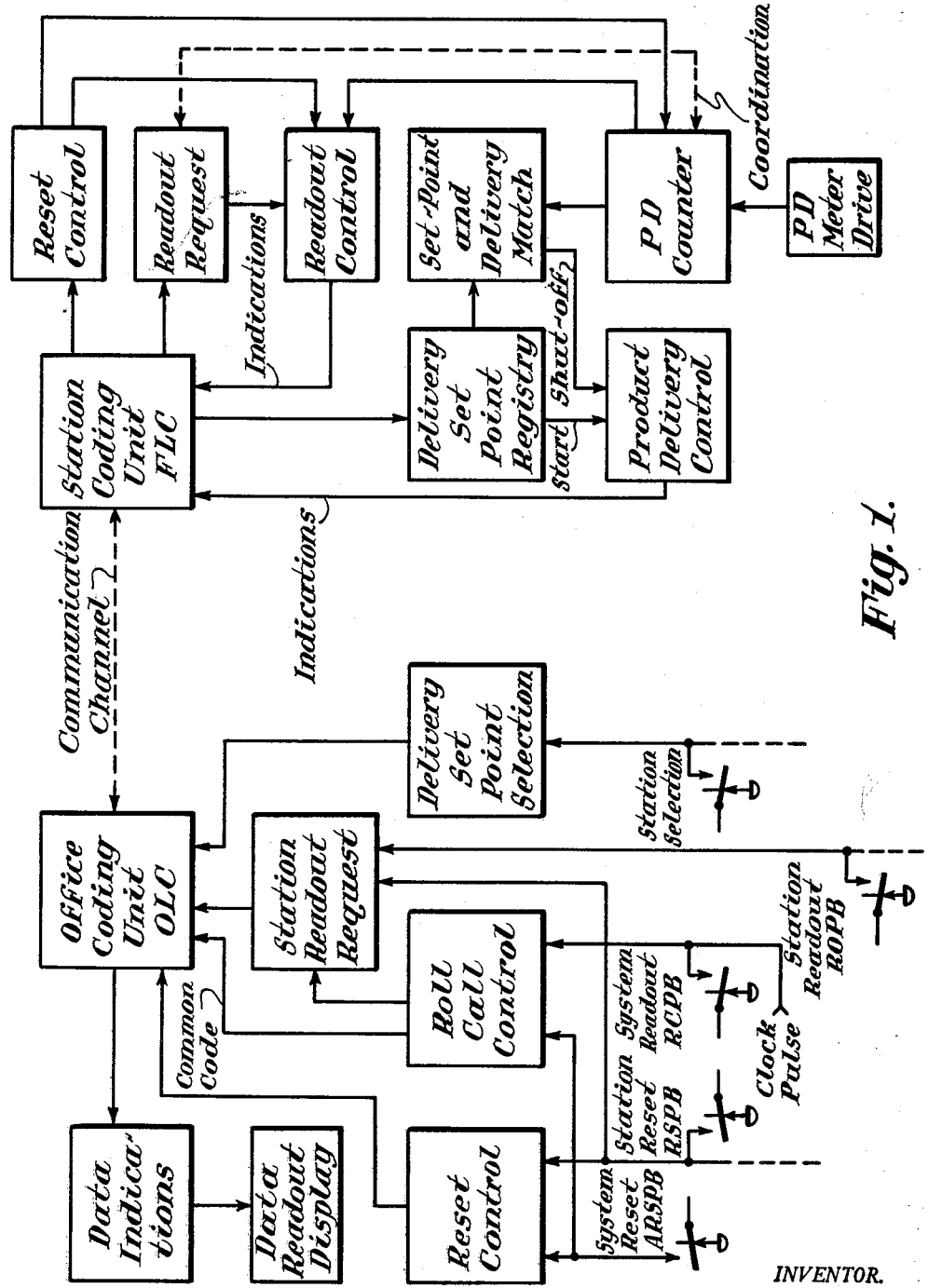

April 28, 1964  A. P. JACKEL  3,130,867
PIPELINE METERING AND PRODUCT DELIVERY CONTROL SYSTEM
Filed May 16, 1961  6 Sheets-Sheet 1

INVENTOR.
Arthur P. Jackel
BY W L. Stout
HIS ATTORNEY

Fig. 4.

United States Patent Office

3,130,867
Patented Apr. 28, 1964

---

3,130,867
PIPELINE METERING AND PRODUCT DELIVERY CONTROL SYSTEM
Arthur P. Jackel, Penn Hills Township, Allegheny County, Pa., assignor to Westinghouse Air Brake Company, Wilmerding, Pa., a corporation of Pennsylvania
Filed May 16, 1961, Ser. No. 110,553
5 Claims. (Cl. 222—20)

My invention pertains to a pipeline metering and product delivery control system. More specifically, my invention pertains to an arrangement for, at any time, obtaining and indicating at a central control office the flow data from several stations located along a product transmission pipeline and for resetting the measurements at these stations to a zero condition. Further, my invention provides for automatically controlling the delivery of the transmitted product at selected stations in response to a quantity control transmitted from a control office or master station location.

Pipeline control systems are now well known in the art and are in general use. In the operation of such pipeline control systems, it is imperative that the system operator at the master or control office location be kept informed of the flow of the product being transmitted through the pipeline. Of particular importance and interest to the operator is the flow information at the various pumping stations in the system, at the input location, at stations where delivery is made to local customers, and at pipeline junction locations where portions of the product may be diverted into branch lines. The quantity of this flow is usually obtained by a positive displacement meter which measures the flow quantity by shaft rotation, the number of rotations being proportional to the volume being transmitted. This shaft rotation can be used to close a contact in an electrical circuit for each unit of measure of the product detected. Such unit of measure may be in single barrel units, for example, or may be in 10 barrel units or other amounts. Closures of this measurement contact are recorded at the station and the data transmitted by the control system to the office location. It is advantageous if the data is recorded in a form readily transmittable by the remote control system in use. One such form which lends itself to easy transmission is the binary number or binary code form. Recording and transmitting actions, of course, must be coordinated in order to avoid the loss of data during transmission and to prevent interference between these two actions since the counting action is relatively continuous in nature. Another need for the system operator is a means of automatically controlling the delivery of the product at those stations where local customers must be served. Such automatic control by the remotely located system operator will eliminate the services of a local operator at such delivery stations whose presence is not needed otherwise for system operation. In order to overcome any delay in data transmission inherent in the remote control system, the delivery shut-off must be automatically accomplished when the selected quantity has been delivered to the customer. This prevents an over supply of the product and relieves the system operator from maintaining a close check on the delivery of the product at each individual location. He may then be free to carry out his other duties in the system operations as necessary.

Accordingly, it is an object of my invention to provide an improved system for controlling and reporting the flow of the product being transmitted in a pipeline.

Another object of my invention is a means for recording the product flow at a station in a pipeline in a form readily transmittable over the remote control system for that pipeline.

Still another object of my invention is a circuit arrangement for initiating product delivery at a selected station location along a pipeline and for automatically stopping delivery of the product when the desired quantity has been supplied to the customer.

A further object of my invention is a binary counting system for recording each digit of the measured quantity of the product flow in a pipeline.

Still another object of my invention is an automatic control system for product delivery from a pipeline which system initiates delivery by establishing a quantity set point and stops delivery when the measured quantity already delivered matches the established set point.

It is also an object of my invention to provide coordination circuits for coordinating count entry and readout actions at pipeline stations to avoid ambiguous data resulting from the simultaneous occurrence of such actions.

Another object of my invention is a control system for requesting individual station or entire system readout of all recorded data in a product transmission system.

A further object of my invention is a data handling system for recording product flow for automatically and remotely controlling the delivery of this product at a station and for reporting such data to a master office location in a pipeline control system.

Other objects, features, and advantages of my invention will become apparent from the following specification when taken in connection with the accompanying drawings.

Referring now to the drawings, FIG. 1 thereof is a conventional flow chart showing, by conventional block diagram and flow arrows, the control and indication function flow arrangement at the control office location and a single station in a pipeline remote control system including the readout, reset, and delivery actions embodying my invention.

Figure 2:
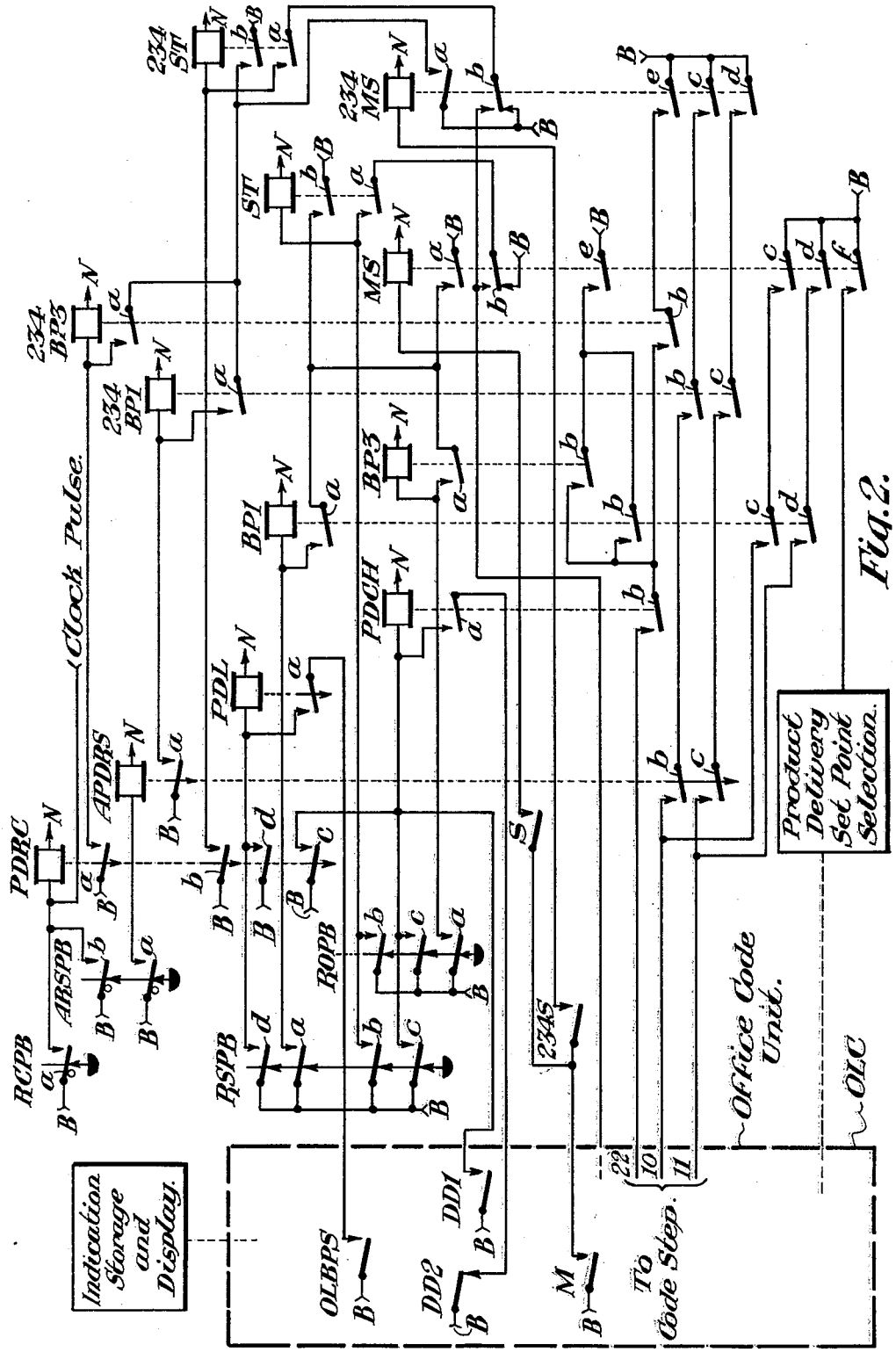

FIG. 2 of the drawings is a diagrammatic representation of office circuits, for the system shown in FIG. 1, embodying one form of my invention.

Figure 3:
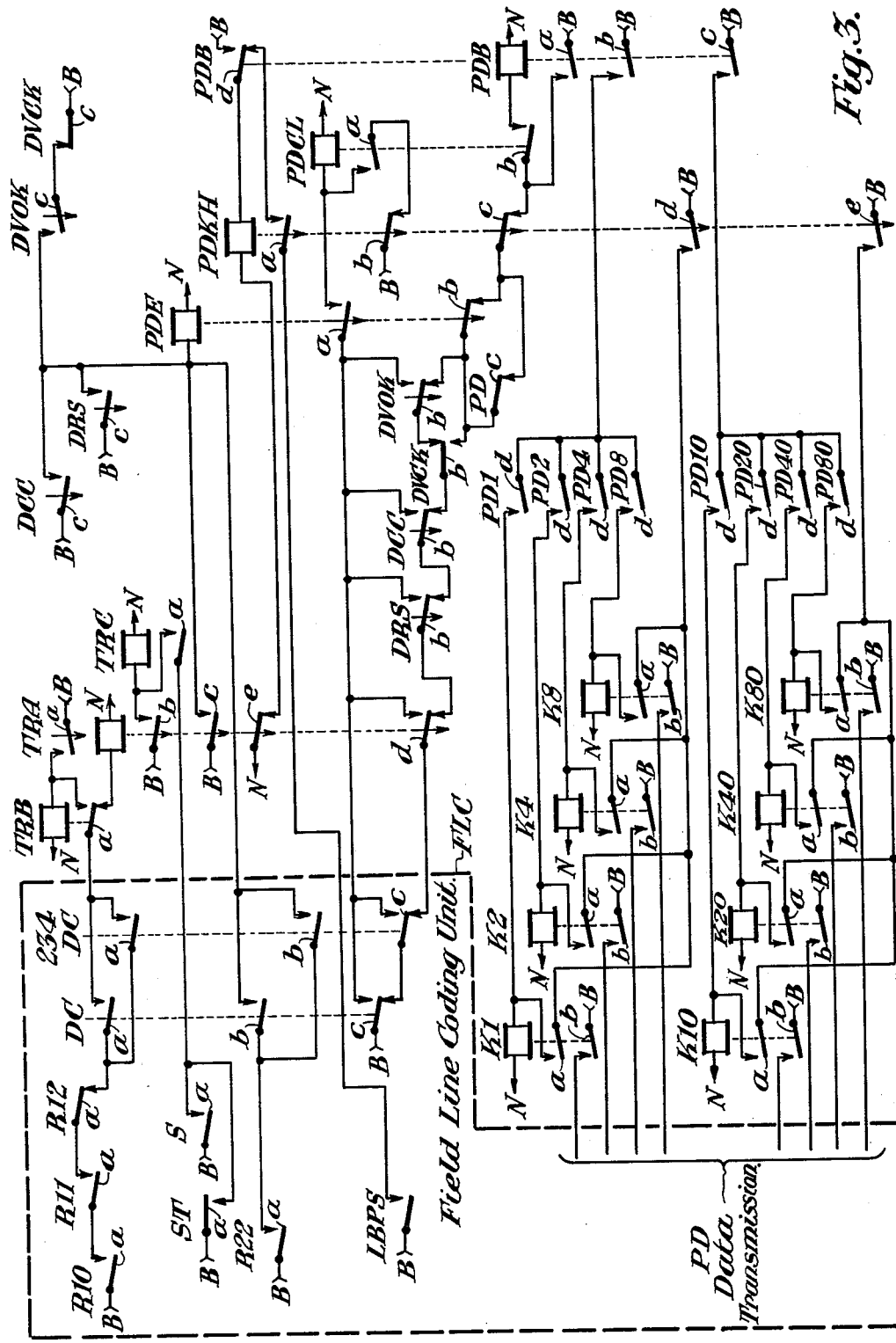

The circuits at a single station are shown in FIG. 3 which control the readout of the data for transmission to the office and the coordination between the readout, reset, and recording actions, these circuits also embodying one form of my invention.

Figure 4:
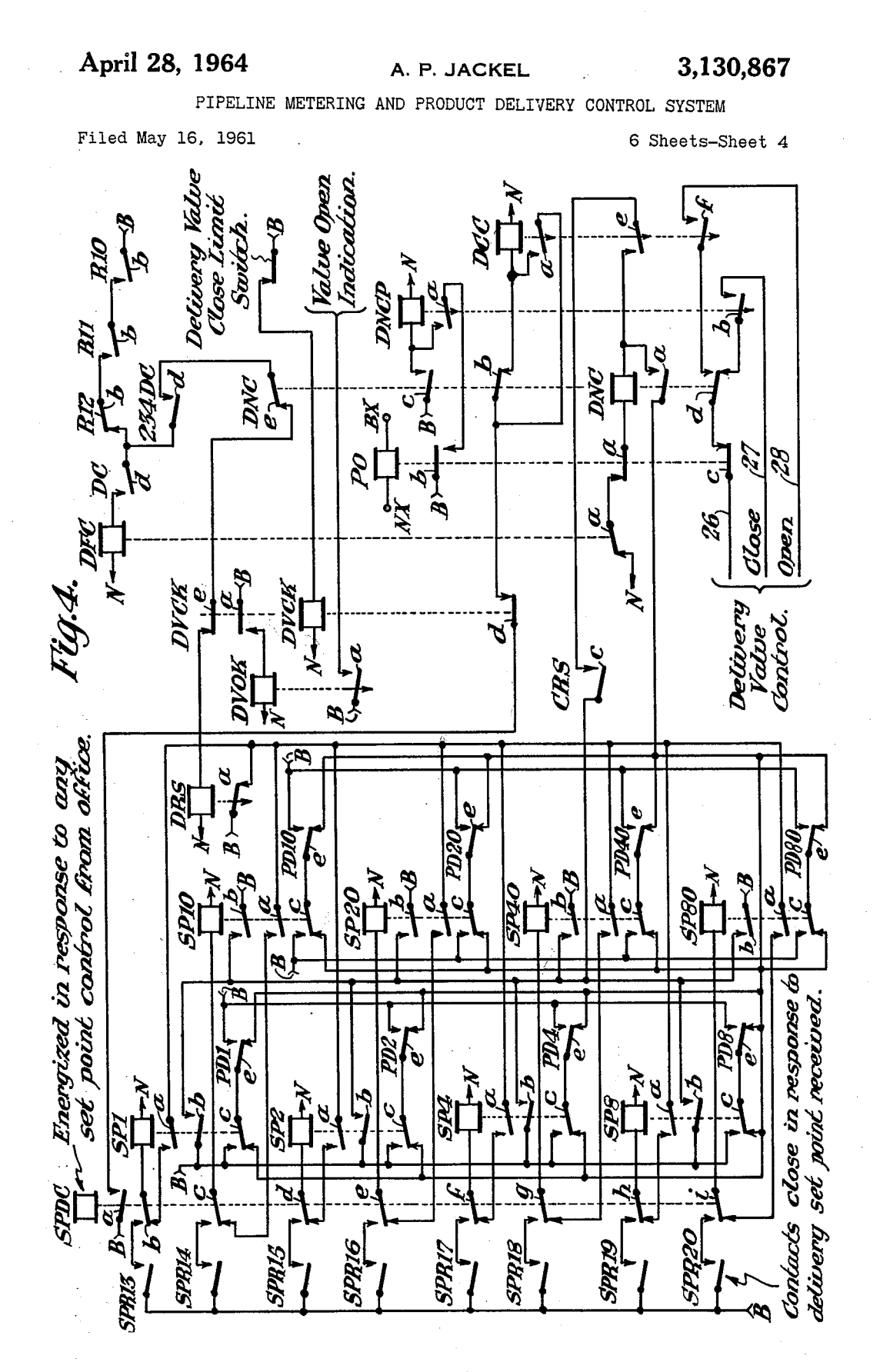

In FIG. 4, control circuitry embodying one form of my invention is shown for the automatic product delivery arrangement of the system of FIG. 1.

Figure 5:
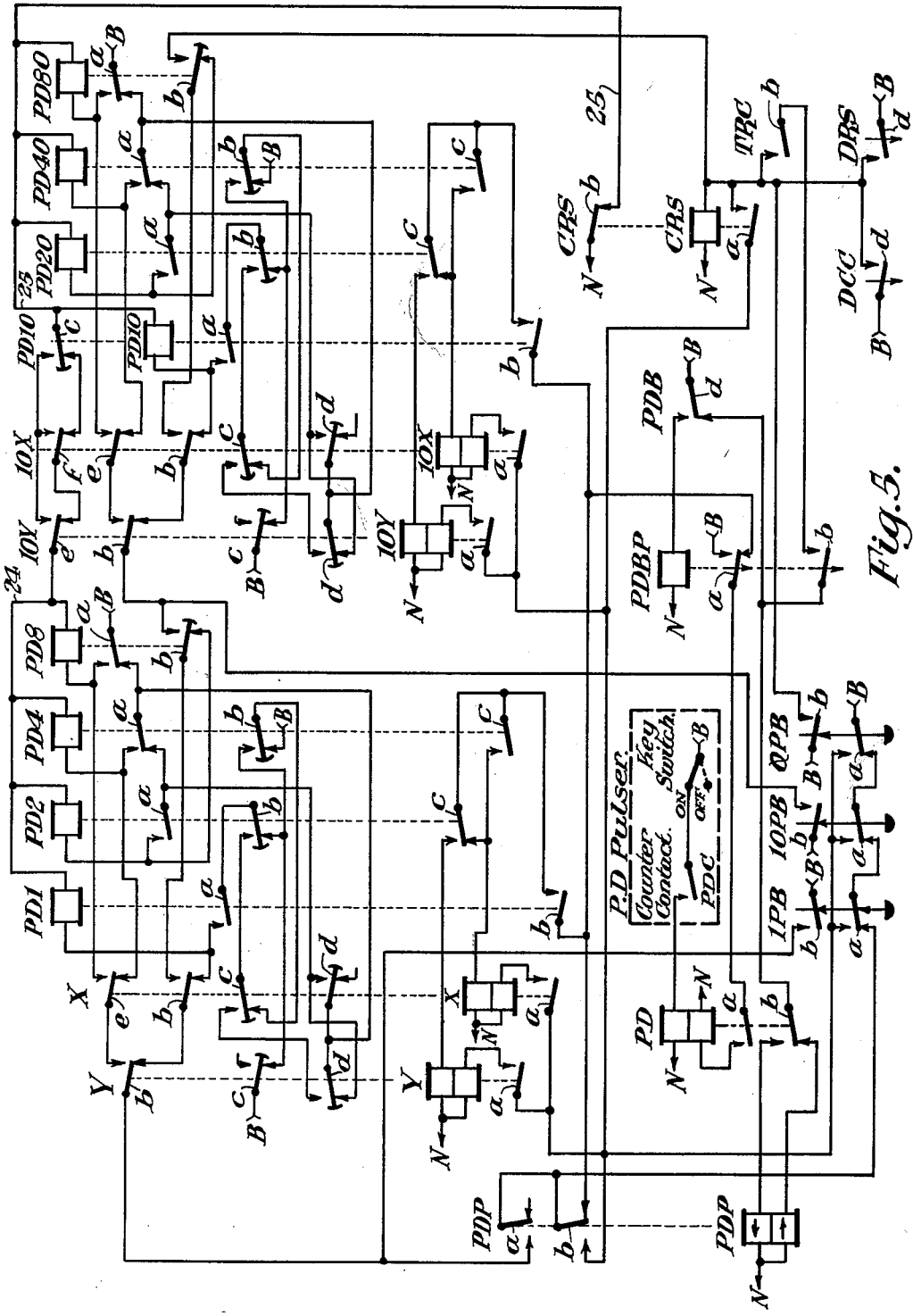

The circuits of FIG. 5 show in diagrammatic form a data recording arrangement illustrated as a decimal-binary counting chain for measuring the product flow at the station of FIG. 1.

Figure 6:
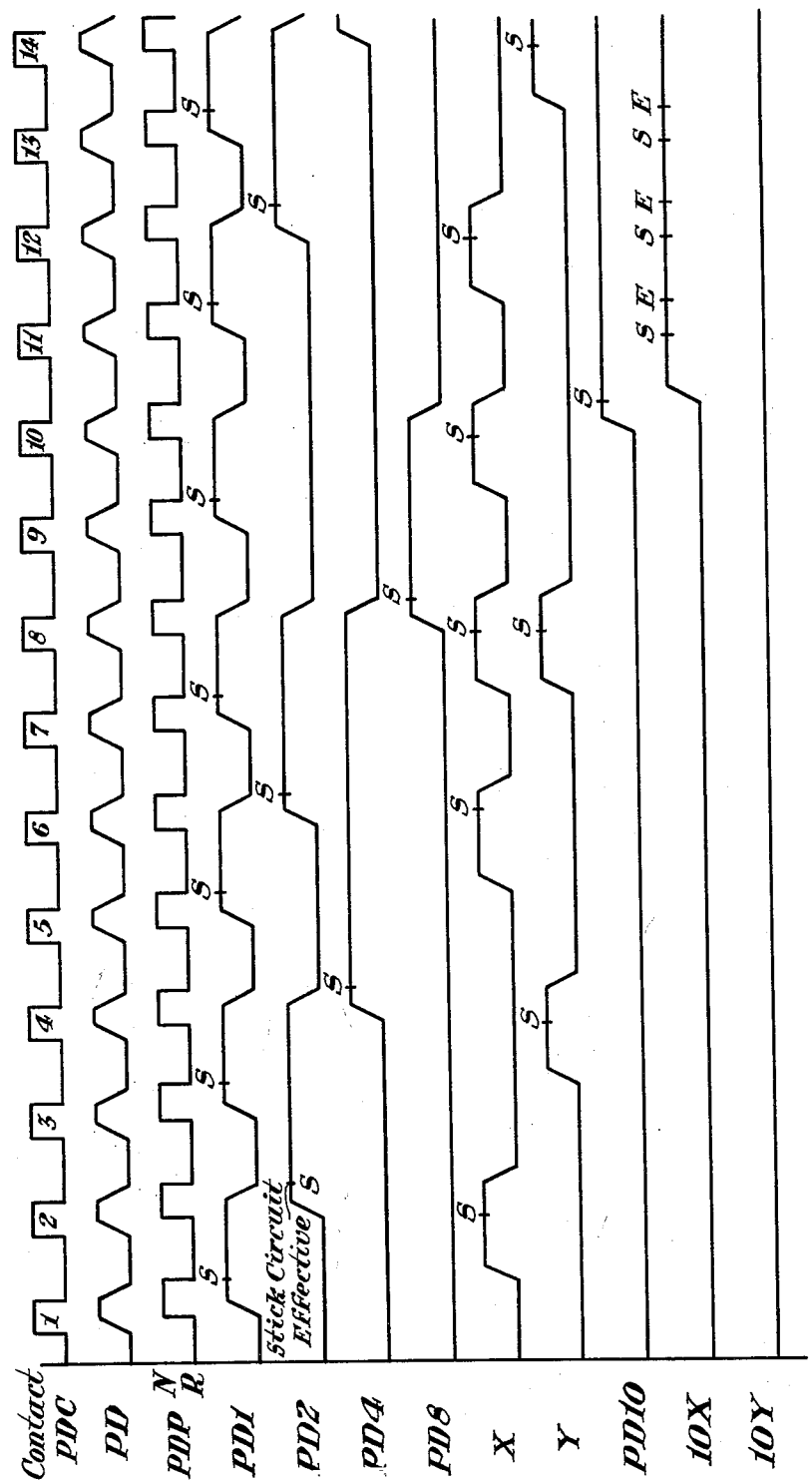

In FIG. 6, a time chart in conventional form is shown for the counting chain operation of the circuits of FIG. 5.

In each of the drawings, similar reference characters denote similar parts of the apparatus.

In practicing my invention, I provide for a product pipeline basically a conventional remote control system extending between the control office or master station and all the field station locations. Over this remote control system, the usual control and indication functions pertaining to the operation of the pipeline are transmitted in opposite directions between the office and stations. In other words, controls may be transmitted from the office for actuating pumps and compressors on and off and for opening and closing the various valves involved in the pipeline arrangement. From the station, indications of the positions of these items of apparatus are transmitted to the office to indicate to the system operator the accomplishment of the desired controls. To this system, my invention adds additional facilities to transmit from the stations to the office location indications concerning product data. These indications include information regarding the flow of product through the pipeline and the delivery of that product to local customers at various stations. These additional facilities also include some control functions such as readout request, reset controls, and delivery actuation. In order to obtain the data regarding product flow at each station, the system of my invention includes a counting chain to record this flow indication, the information being obtained from a positive displacement or turbine meter (hereinafter designated a PD meter) through its operation of a contact responsive to shaft rotation. This counting chain is specifically shown as being of the decimal-binary code type in which four relays record, in binary form, each digit of the decimal number representing product flow. The PD meter contact normally drives that portion of the entire chain which records the units digit of the decimal number. Two additional stepping relays are also provided with each portion of the chain, that is, each digit section, to control the binary counting action. When the units digit section records, in binary form, a count of ten, a single count is entered into the next digit section or portion of the chain and the corresponding unit section resets to its zero position. A similar action occurs between each pair of adjacent sections as a ten count is recorded in the lower digit section. Such action, of course, is continuous as long as the PD meter contact continues to indicate or record flow of the product through the pipeline.

When a readout request control function is received at a station in any manner, a coordination cycle is initiated, the system of my invention including the apparatus for controlling such operation. If a data count from the PD meter contact is in actual progress, the readout action is delayed and the request held until the specific count is completed. Once the readout action is initiated, the next count from the meter contact is stored and its entry delayed until the readout action has progressed beyond the extraction of the existing count from the chain relays. The existing count is read out of the chain relays into a bank of rack-up or temporary storage relays where the reading is held until it can be transmitted over the remote control system to the office. When it is transmitted to the office, it is there recorded and displayed in any desired manner. In addition, various permanent records may be made as required or desired by a particular system control arrangement. For example, the information data from the various stations may be recorded in an electric typewriter through a programming arrangement such as shown in the copending application for Letters Patent of the United States Serial No. 780,019, filed December 12, 1958, by D. E. Stark for Programming Control Circuits, now Patent No. 3,096,138, issued July 2, 1963, this previous application and the present application having a common assignee. However, the programming arrangement or similar action is not a specific part of the present invention and is not shown or discussed in any detail. The request for data readout from the stations may come as a single station readout request or reset demand initiated by the transmission of a corresponding control function from the office. The readout request at a station may also come as part of a system roll call control function transmitted simultaneously to all stations by a common control code. In this instance, each station in its turn transmits the existing data of product flow to the office for display. The transmission of an all station reset control function from the office by this common control code also initiates a data transmission from each station in turn, the data being extracted simultaneously from the counting chain into the temporary storage bank prior to the reset of the counting chain to its zero position as part of the reset demand.

At a delivery station, a similar counting chain is provided to record the quantity delivered to the local customer. Such product delivery is initiated only by the transmission from the control office of a so-called set point control. The set point is actually the desired quantity of the product to be delivered to the customer and is transmitted in a code form similar to that produced by the counting chain measuring the product flow. The set point received at a delivery station is stored in a bank of relays, this bank being similar in composition to the counting relays themselves. This storage of the set point quantity actuates the opening of the delivery valve at that station. During product delivery, the counting chain driven by the PD meter contact records the quantity of the product being delivered. When the delivery count matches the set point storage, the delivery valve is closed and the process of delivering the product halted. The matching between the existing count and the set point storage is accomplished in a contact matrix comprised of set point and counting relay contacts. The system operator can halt the delivery of the product, during the delivery process, short of the set point previously set by setting a new level at a lower amount or by transmitting a delivery off control. Readout of the delivery count can be obtained upon demand by the operator.

I shall now describe in detail the circuits, shown in the drawings, embodying one form of my invention. I shall then point out the novelty thereof in the appended claims.

At each location shown in the drawings, a local source of direct current energy is supplied for energizing the various relays and other apparatus. This source of energy may be a battery or a rectifier energized by the local alternating current power source. Since the use of such direct current sources is conventional and well known, the source here used is not shown in detail and only its positive and negative terminals are indicated by the reference characters B and N, respectively. Various ones of the relays used throughout the arrangement are provided with slow release characteristics. Such relays are indicated by the use of downward pointing arrows drawn through the movable portion of each contact of that relay. It is to be understood that such relays hold front contacts closed for a predetermined period of time after the relay winding is deenergized. In general, contacts for each relay are shown in vertical alignment with the symbol for the relay winding, the contacts being above or below the winding as the diagrammatic circuit arrangement requires. However, in order to simplify the drawings, exceptions are made to this general rule and contacts are shown separated from, and on other figures of the drawings than, the relay winding and its control circuits. In such cases, these contacts are designated, not only by the lower case letter which is a specific reference for that contact, but also by repeating the general reference character for that relay immediately above the separated contact. Some of the relay contacts are of the type known as continuity transfer contacts and are so designated by a short arc appended to the end of the movable armature of that transfer contact. In the operation of such contacts, a front contact circuit is made before the circuit over the corresponding back contact is broken. Such operation is well known and needs no further description. Other special symbols used in the drawings for unique parts of the apparatus will be described in detail when that apparatus is first described in the following specification.

Referring now to FIG. 1, a function flow chart of a remote control system embodying the control and coordination arrangements of my invention is shown by conventional block diagram and with conventional function flow arrows. The major parts and/or elements of my invention are each indicated by a conventional block. As previously indicated, the system embodying my invention is applied to a standard or conventional remote control system having a control office or master station and one or more remote field locations. Preferably, the remote control system is of the time code type, such as disclosed in Letters Patent of the United States 2,442,603, issued to me on June 1, 1948, for Remote Control System. It is to be understood, however, that other types of remote control systems may be used and the arrangements of my invention modified in well known and conventional manner to be adapted to such other types of systems. However, in the present case, the time code type system will be considered specifically as a basis for the operation. It this application of the system of my prior patent, the arrangement is modified sufficiently to provide additional capacity over that indicated and disclosed in this patent. However, such modification has not changed the basic operation of the system. Shown in FIG. 1 are the office and station coding units, OLC and FLC, respectively, for the master location and a single station only. These are connected by a communication channel of any customary type, it being well known to use either a direct current line circuit or carrier circuits for such communication channels in these remote control systems. Actually, the system embodying the arrangement of my invention is normally of a multi-station type, the various stations being connected in multiple to the communication channel in use. Codes are transmitted in each direction over this channel, one at a time, control and indication codes being originated at the office and at the station, respectively, as described in complete detail in my previously mentioned prior patent. The complete details of the operation of this time code remote control system will not be herein described in order to simplify and shorten the following description and reference is made to the patent for as complete an understanding as may be desired.

Four control functions are shown at the office location in FIG. 1, each by a conventional block form. These functions are the reset control, the roll call control for the system, the station readout request, and delivery set point selection. These various controls may be actuated in several ways. I shall initially discuss the system readout control which is actuated by a manually operable switching device shown as a pushbutton RCPB. This control may also be actuated by periodic clock pulses from a timing mechanism. If device RCPB is actuated to initiate a roll call control, which is a request for data readout to each station in the system, a common control code is initiated and transmitted by the office coding unit OLC. As a specific example, the station selection portion of this code may be preset to be the code number 234 and the system so arranged that this station selection code selects each station of the system to respond to the code. In addition, the station readout request control function is transmitted for each station being actuated by the roll call request. This readout request is transmitted to each station on a different code step in the arrangement here shown so that individual station requests may be differentiated in a more simple manner.

A reset control function is transmitted to a station upon the actuation of a corresponding station reset device at the office. When this device, shown as a pushbutton RSPB, is actuated, a control code is initiated by unit OLC to the selected station, here assumed to be the station shown at the right in FIG. 1. This control code carries to that station a reset control and also a station readout request. The reset control causes the station to reset its counter to its zero position after the existing total reading is extracted for transmission to the office as an indication. A reset control may also be initiated by the actuation of a system reset device shown as a pushbutton ARSPB. The actuation of this pushbutton initiates, through the roll call control function, the common control code selecting all stations. Because of the roll call control actuation, a station readout request is also transmitted to each station along with the common reset control function. Thus, this type of a system reset is similar to a roll call with the addition of the reset control for each station. Each station reads out the existing data into temporary storage for transmission to the office in its turn, and in addition, resets its counter to the zero position. Additionally at the office, a means is provided for receiving and recording the data indications from the various stations, a data readout display apparatus being associated with the indication storage device. The data indications from any station are thus received and the information displayed for the use of the operator. If a recording device is also used, it will be associated and controlled by the data indication arrangement.

At the various stations, the control functions transmitted from the office are received and acted upon in accordance with the station selected. Obviously, if the common control code is transmitted, that is, the 234 station code, all stations in this system are selected and the control functions received and acted upon. However, in order to provide a data readout at the various stations, some means of recording the product flow is essential. This may be accomplished by having a positive displacement counter means driven by the PD meter through the contact responsive to its shaft rotation. Various forms of counter may be used. In the present case, I shall consider and describe a binary counting chain which is part of the system of my invention. This counter is shown by conventional block in the lower right of FIG. 1 at the station location, the drive means being also indicated by the conventional block with flow arrow into the counting device. A more complete description of this arrangement will be given, of course, in the detailed discussion of the circuits to follow.

When a readout request is received at the station shown in FIG. 1, whether as an individual station readout or roll call request, the counter reading is extracted into a temporary storage arrangement included in the block designated readout control. At the proper time, the station control unit LCS then transmits this stored reading as an indication code to the office where it is received by the data indication arrangement and displayed for use by the operator. When a reset control is received by this station, whether it be an all stations or system reset or an individual station reset for this station alone, the reset control receiving means actuates a readout from the counter to temporarily store the existing reading in the readout control arrangement. The counter is then reset to its zero position as a result of the reset control function. The extracted data information is then transmitted at the proper time by this station to the office for reception and display. The various coordination arrangements between the readout request and the counting arrangement have been previously mentioned, that is, one or the other must be delayed to avoid the loss of a data count or the transmission of an ambiguous indication function to the office. Such coordination during a readout request will be described in detail in connection with the detailed circuit arrangement.

Coordinated with the readout and reset actions at the station shown in FIG. 1 is the control of the delivery of the transported product to a local customer at this station location. Product delivery is accomplished by establishing at the station a desired quantity for delivery, known as the set point, and matching this desired quantity with the measurement of the actual delivered quantity being furnished to the customer. When the desired and measured quantities agree, a detection of this agreement or matching point actuates the halting of the delivery action. No control on the part of the system operator, other than the establishing of the initial set point, is necessary during product delivery. A single control is transmitted from the office to the station as a delivery set point selection. The selection of the desired quantity is made in the delivery set point means, the desired station selected, and the control transmitted in the usual manner over the remote control system. It is to be noted that the set point amount or quantity must be transmitted and recorded at the station in a form similar to that in which the counter records the product flow as measured by the PD meter. At the selected station, for example, the station shown at the right of FIG. 1, the set point transmission is received and registered in the delivery set point register bank. Reception of any set point at this station actuates the delivery of the transported product, the product delivery control actuating the opening of the delivery valve into the customer's storage arrangement. An indication of this initiation of the delivery, that is, of the opening of the valve, is returned to the office. If not previously accomplished, the counter is set to zero at the beginning of the delivery action and then records the count of the quantity delivered to the customer. As shown in FIG. 1, the same counter is used to record the delivered quantities as well as the quantity throughput in the pipeline. Preferably, two counters may be used for these purposes, one for each. The established set point and the delivered quantity measurement are continuously compared in the set point and delivery matching matrix. When the established set point and the delivered count are equal, the agreement is detected and a shut off control passed to the delivery control means. The valves are closed to halt delivery. An indication of the stop action is transmitted to the office location. Information regarding the actual delivered quantity may be recalled from the station as desired. In addition, the existing delivered measurement may be read out from the station at any time during the delivery action.

It is apparent then, from the function flow chart shown in conventional form in FIG. 1, that the system operator at the office location is able to control the various functions at the station location, requesting the transmission of recorded data from that station at any time, either individually or as a sysem recall action. In addition, the apparatus may be set to its zero position or condition to establish an initial point for further recording action. Finally, by the transmission of a single set point selection, the operator can initiate the automatic control of product delivery to a customer at a local station. The delivery action is halted when the desired amount has been delivered without further control by the system operator.

Turning now to FIG. 2 of the drawings, I shall discuss the office location circuits dealing with the coordination and control of the system of my invention. In the upper left portion of this figure are the control pushbuttons for initiating the various control functions equivalent to those discussed in connection with FIG. 1. The roll call pushbutton RCPB and the all stations reset pushbutton ARSPB are, of course, associated with the entire system, that is, with the several stations comprising one installation. The station reset pushbutton RSPB and the station call or readout pushbutton ROPB are, in the present example, specifically associated with the station circuits shown in FIGS. 3, 4, and 5, which will be discussed shortly. The equivalent of the last two pushbuttons, of course, will be provided for each station of the system, since each deals with a specific station call. Pushbutton devices RSPB and ROPB are of the spring return type having normally open contacts, as indicated by the conventional symbol for such pushbuttons used in the drawings. In other words, when the pushbutton is actuated, each contact armature is moved against spring pressure to close with the corresponding fixed contact. As soon as the pushbutton is released, the armatures are returned to their normal position in which the circuits are open. Each of these pushbuttons thus requires a repeater in the form of a stick relay at least in order to store the control initiated by the operation of that pushbutton. Pushbuttons RCPB and ARSPB are, as shown by the conventional symbol used to illustrate the devices, of the stick type. That is, when the pushbutton is actuated, each contact armature is moved against the corresponding fixed contact to complete the circuit connection. The pushbutton remains in this position, after the original actuating pressure is removed, until an opposite pressure is applied, i.e., the device is pulled out to its normal position. However, in order that sufficient contacts will be available for all needs, each of these two pushbuttons is also repeated by one or more relays. Thus, pushbutton RCPB is repeated by the positive displacement roll call relay PDRC. Pushbutton ARSPB is repeated by the all stations positive displacement reset relay APDRS and also by relay PDRC. It may be noted that at this time that relay PDRC is also periodically energized by pulses received from a time clock arrangement, if it is desired to initiate a roll call action of all stations periodically on a time interval basis.

Relays APDRS and PDRC are further repeated by the button repeater relays 234BP1 and 234BP3, respectively. These button repeater relays control the actual transmission of the control functions. The prefix 234, included in the reference characters, indicates that these relays are particularly associated with the common control code to all stations associated with the roll call and the all stations reset actions. Each of the button repeater relays is energized by simple circuit including front contact $a$ of the corresponding actuating relay. When relay PDRC is energized and closes its front contacts, it also completes a circuit over its front contact $b$ for energizing the start relay 234ST, this being the start relay to initiate the common control code to all stations, in the manner completely described in my prior patent previously mentioned. Each of relays 234BP1 and 234BP3 is provided with a stick circuit arrangement, including its own front contact $a$ and initially front contact $b$ of relay 234ST. A multiple connection to terminal B of the local source is also provided in these stick circuits over front contact $a$ of the master, station relay 234MS. This latter relay is energized during the transmission of a control code after the station selection portion of that code has been completed. Specifically, the energizing circuit for relay 234MS extends from terminal B over a front contact of the master relay M (within the office coding unit OLC shown at the left), a front contact of station relay 234S, and the winding of relay 234MS to terminal N. The office coding unit of the remote control system here used is designated in a conventional manner by the dash rectangle designated by the reference character OLC, since the complete circuit details and description of the remote control system are not necessary for the understanding of my invention. Only such specific portions as need be included in the present circuit arrangement for an understanding of my present invention are shown. It is to be understood that unit OLC corresponds in general to the similar arrangement shown in my prior Patent 2,442,603, to which reference is made for a complete showing of the coding unit circuits. It need only be understood that, during the transmission of a control code, master relay M remains continuously energized so that its front contacts are closed throughout the coding period. Although not included within the office coding unit, the station relays S are associated therewith and are energized, during any code to the corresponding station, at the end of the station selection portion at the beginning of the code. Thus, the front contact of relay 234S will be closed after the fourth code step in the common control code to all stations. The front contact of station relay S, shown in another circuit to be discussed shortly, represents a front contact of the station relay for the particular station shown in FIGS. 3, 4, and 5 of the present case. This contact will be closed after the transmission of the final station selection step for that individual station. The corresponding master and station relay MS for the individual station of FIG. 3 is energized during transmission of a control code specifically to that station by the circuit including the front contact of relay M, the front contact of relay S, and the winding of relay MS, as is obvious from inspection of the drawing.

Pushbuttons RSPB and ROPB are directly repeated by the corresponding button repeater relays BP1 and BP3. The circuit for each of these button repeater relays includes contact *a* of the corresponding pushbutton. Each relay is also provided with a stick circuit including its own front contact *a*, and in multiple, front contact *b* of a start relay ST and front contact *a* of relay MS. Start relay ST, which is associated with the code to the individual station of FIG. 3, is energized by the closing of contact *b* of either pushbutton RSPB or ROPB. Relay ST is provided with a stick circuit including its own front contact *a* and initially back contact *b* of relay MS. When relay MS becomes energized during a control code, the stick circuit is shifted over its front contact *b* to the circuits within coding unit OLC which hold relay ST energized until approximately mid-way in the control code. This operation is completely shown and described in the aforementioned reference patent. It may be noted that relay 234ST is also provided with a stick circuit which includes its own front contact *a* and initially back contact *b* of relay 234MS, later shifting to the corresponding front contact *b* and the circuits within unit OLC. The positive displacement change relay PDCH also repeats the operation of either of the individual station pushbuttons, the closing of contact *c* of either of pushbuttons RSPB and ROPB energizing this latter relay. Relay PDCH may also be energized by the circuit arrangement including, in multiple, front contact *c* of relay PDRC and a front contact of data delivery relay DD1 associated with unit OLC. This latter contact is closed at the end of a first data indication code from the corresponding field station. A stick circuit for relay PDCH includes its own front contact *a* and a back contact of another data delivery relay DD2. This relay DD2 is energized, and thus its back contact opens, at the end of the successive data codes transmitted from the corresponding field station. In addition to its control, by its front contact *b*, of the transmission of a readout or recall request, relay PDCH is also involved in a complete system in the control of the programming of the received and recorded information from the various stations, such as shown in the aforementioned Stark application. This control is not here shown since it does not deal specifically with my present invention. Positive displacement lockout relay PDL is likewise involved in the control of the programming arrangement, particularly in connection with programming occurring after an individual station reset request has been transmitted through the operation of pushbutton RSPB. Relay PDL is obviously energized when contact *d* of this pushbutton is closed. It is held energized by its stick circuit including its own front contact *a* and a front contact of one of the bridging relays in the timing chain within unit OLC, specifically shown as a front contact of relay OLBPS. This latter front contact remains closed during any coding action by office code unit OLC. Another circuit for energizing relay PDL is completed by front contact *d* of relay PDRC. Relay PDL thus operates also during system roll call and reset actions.

To show the transmission of the reset and readout control to the various stations, certain steps of the control codes have arbitrarily been selected for carrying such controls. In other words, when code steps 10 and 11 of a code to a particular station or of the common code to all stations are transmitted as long code steps, a reset action is requested and actuated at individual stations or at all the stations, respectively. Correspondingly, for the station in FIG. 3, a data recall or readout action is initiated when code step 22 of a code to that station is transmitted with a long characteristic. An application of energy from terminal B of the local source to the connection into unit OLC, indicated in the lower part of the rectangle, is sufficient, as explained in my previously mentioned patent, to cause the corresponding step indicated by the number associated with these lines to be transmitted with a long characteristic to accomplish the function desired. For example, during the transmission of the common control code bearing the station classification 234 for an all stations reset action, energy is supplied through the connections into unit OLC over the one circuit which may be traced from terminal B over front contact *c* of relay 234MS, front contact *b* of relay 234BP1, front contact *b* of relay APDRS, and thence over line 10 into unit OLC. The corresponding circuit for code step 11 includes front contact *d* of relay 234MS and front contacts *c* of relays 234BP1 and APDRS. An individual station reset action for the station of FIG. 3 may be initiated by application of energy to lines 10 and 11 over, respectively, front contacts *c* of relays MS and BP1 and front contacts *d* of these same two relays.

During a common code for a roll call action at all stations, code step 22 is made long by the application of energy from terminal B to wire 22 over front contact *e* of relay 234MS, front contact *b* of relay 234BP3, and front contact *b* of relay PDCH. During an individual readout request to the station of FIG. 3, energy is supplied to line 22 over front contact *e* of relay MS, front contact *b* of relay BP3, and front contact *b* of relay PDCH. Since an individual reset action to station of FIG. 3 must also request the readout and transmission of the existing data, front contact *b* of relay BP1 is connected in multiple with front contact *b* of relay BP3 to supply energy to line 22 during the transmission of an individual station reset code to the station in FIG. 3. It is to be noted that, since relay PDRC is also energized when pushbutton ARSPB is actuated, the same circuit for supplying energy to give step 22 a long characteristic is completed during system reset as during system roll call action.

Also shown in FIG. 2, by conventional block, is a product delivery set point selection bank by which the set point for product delivery at desired station may be selected. In order to transmit this set point selection, for example to the station of FIG. 3, energy is applied to the set point selection bank over front contact *f* of relay MS and from the set point selection bank into unit OLC in a manner shown conventionally by a dotted line. It is to be understood that the set point selection means provides for transmission of a set point selection code in the same form as the flow count at the station so that matching may be accomplished. Since the transmission of a set point control to the station of FIG. 3 is conventional in such remote control systems, no further details of the transmission are here shown at the office location of FIG. 2. Additional description and showing of the reception and storage of such set point controls at the station will be described in connection with the circuit arrangement at that location. Also conventional is the reception and storage of indications at the office location from the various stations. Accordingly, details of this arrangement are not shown, the indication storage and display being indicated in conventional manner by block diagram shown above the conventional dash rectangle of the coding unit with the corresponding connection by conventional dotted line to unit OLC. It is believed that the cooperation of these coordination and control circuits at the office can be fully understood after the explanation of the detailed circuits at the station location of FIGS. 3, 4, and 5. I shall now proceed with the description of the detailed circuits at that location.

Shown in FIG. 3 are the general circuits at the station location for controlling and coordinating the readout and reset actions of the positive displacement data already recorded. It is to be noted that the specific circuit for resetting the counter is shown in FIG. 5 where the counter circuits are shown in detail. The left portion of FIG. 3, within the conventional dash rectangle, shows such details of the field line coding unit FLC as are needed for an understanding of the present invention. Again, reference is made to my prior Patent 2,442,603 for a complete showing and description of the circuits within the field line coding unit in the remote control system herein assumed in use. Shown within unit FLC are contacts of certain relays of the coding system. For example, a front contact of the bridging relay LBPS of the coding unit timing chain is shown. This contact is closed during the first step of any coding action and remains closed throughout the entire coding action, releasing at the end of the code. Also, shown is a back contact of the station start relay ST. This relay is normally energized and releases when an indication code is stored for transmission, remaining deenergized until midway in the transmission of that code. Thus, its back contact *a* here shown closes when a code is stored and opens during transmission of that code. Correspondingly, station relay S is picked up during any coding action when this station is selected, that is, at the end of the station selection code call for the station of FIG. 3. Thus, its front contact *a* shown here becomes closed at that time and remains closed until the end of the code. During the final step of any received control code selecting this station as an individual location, the delivery control relay D.C. is energized and picks up to close its front contacts, obviously opening its corresponding back contacts. This relay holds its front contacts closed for a relatively short interval of time at the end of the code to deliver the received control functions into the function relays. A similar relay operating in an equivalent manner when a common code control is transmitted throughout the system, selecting all stations, is relay 234DC, contacts of which are also shown within the bounds of unit FLC. This relay holds its front contacts closed and back contacts open for the same relatively short period at the end of a common control code. The registry relays R10, R11, and R12, contacts of which are shown at the top of coding unit FLC, are the storage relays associated with the reset action transmitted to this station under any code condition. These relays are normally released and become energized upon the reception of a long code step in the corresponding position in the code. Thus, upon reception of a reset request from the office, relays R10 and R11 are energized and close their front contacts to complete certain of the circuits. Relay R22 is a similar storage relay associated here with the recall control for this particular station. When the corresponding code step of any code transmitted to this station has a long characteristic, relay R22 is energized and closes its front contact at that time to initiate the recall action.

When a reset control is received, the various reset relays TR are energized in successive order. For example, upon reception and completion of the control code carrying the reset control function, the circuit is completed from terminal B over front contacts *a* of relays R10 and R11, back contact *a* of relay R12, front contact *a* of relay D.C. or relay 234DC depending upon the type of code, back contact *a* of relay TRB and the winding of relay TRA to terminal N. Relay TRA picks-up, closing its front contacts *a* and *b* to energize, respectively, relays TRB and TRC. Relay TRB then picks-up, opening its back contact *a* to interrupt the circuit of relay TRA and closing its corresponding front contact *a* to complete a stick circuit for itself which is effective until delivery control relay DC releases. Relay TRC closes its front contact *a* to complete a stick circuit, further including back contact *a* of relay ST in multiple with front contact *a* of relay S. Relay ST releases during the completion of this control code to store an indication code, closing its back contact *a* to complete the stick circuit for relay TRC, front contact *a* of relay S retaining this stick circuit effective during the transmission of the following indication code until the end of that code. Relay TRA, having slow release characteristics as indicated by conventional symbol, retains its front contacts closed, although deenergized, for a period of time. Relay TRA also completes, at its front contact *c*, a circuit for entry relay PDE which, thus energized, picks-up. Relay PDE is also energized if a recall control is received, the circuit including front contact *a* of relay R22 and front contact *b* of relay DC or 234DC. Other multiple circuits for relay PDE include front contact *c* of delivery command control relay DCC, front contact *c* of delivery reset relay DRS, and front contacts *c*, in series, of the delivery valve indicating relays DVCK and DVOK. The utility for these energizing circuits for relay PDE will appear later in the discussion as the various relays are described.

With either relay DC or relay 234DC picked-up at the end of the code and with relay PDE now energized, the circuit is complete for energizing the call relay PDCL. This circuit includes front contact *a* of relay PDE and either front contact *c* of relay DC or back contact *c* of relay DC and front contact *c* of relay 234DC. Relay PDCL picks up to complete a stick circuit including its own front contact *a* and back contact *b* of indication hold relay PDKH. Several alternate circuits for energizing relay PDCL are provided. The first of such circuits includes back contacts *c* of relays DC and 234DC and front contact *d* of relay TRA, this latter relay being slow release and holding its front contact closed for a period of time after it is deenergized. Other alternate circuits may be completed over individual front contacts of the various relays associated with the product delivery arrangement. Such circuits may be traced as desired by reference to FIG. 3. It is noted, of course, that front contact *a* of relay PDE is included in each of the energizing circuits for relay PDCL. These alternate circuits for this latter relay provide for initiating a data transmission to the office under conditions involving reset action and the delivery control action in its various aspects. These matters involving the delivery control will become more apparent when the circuits of FIG. 4 are described in detail.

Upon the release of whichever delivery control relay DC is picked-up during the code and at the end of the slow release period of relay TRA, if also energized, the circuit is completed for energizing bus relay PDB. This circuit is traced from terminal B over back contacts *c* of relays DC and 234DC, back contact *d* of relay TRA, back contacts *b* of relays DRS and DCC, front contact *b* of relay DVCK, back contact *b* of relay DVOK, back contacts *c* and *b*, in multiple, of relays PD and PDE, respectively, back contact *c* of relay PDKH, front contact *b* of relay PDCL, and the winding of relay PDB to terminal N. With relay PDE picked-up, back contact *c* of positive displacement relay PD of the counter drive circuits bypasses the open back contact of relay PDE in this circuit to cause the energization of relay PDB at the end of the next unit count. If relay PD should be incorrectly held energized by the PD meter, the eventual release of relay PDE will complete the circuit to energize relay PDB to actuate the data readout described below. When relay PDB picks-up, the closing of its front contact *a* completes a stick circuit also including front contact *b* of relay PDCL so that relay PDB remains energized as long as relay PDCL is energized.

When relay PDB picks-up, it causes the count existing in the counting device at that instant to be registered in the rack-up or temporary storage relays K. There is a storage relay K for each relay in the counting device. The numerical suffix used in the designation for the K relays corresponds to the numerical suffix used for the counting relays PD, contacts of which are shown in vertical row in FIG. 3. For example, if counting relay PD1 is picked-up so that its front contact *d* is closed, the circuit is completed, further including front contact *b* of relay PDB, to energize storage relay K1. Similar circuits may be traced for the other storage relays. The tens digit counting relays complete circuits for the storage relays over contact *c* of relay PDB in order to divide the load on these contacts. The K relays are held energized by stick circuits completed at front contacts of the indication hold relay PDKH. For example, referring again to relay K1, the stick circuit for this relay includes front contact *d* of relay PDKH and front contact *a* of relay K1. The stick circuit for relay K10 includes front contact *a* of that relay and front contact *e* of relay PDKH.

Relay PDKH is energized when relay PDB picks-up, the circuit including front contact *d* of relay PDB, the winding of relay PDKH, and back contact *e* of relay TRA. Relay PDKH is thus energized upon the energization of relay PDB but at the end of the slow release period of relay TRA if this relay were originally picked-up. A stick circuit for relay PDKH includes a front contact of relay LBPS within unit FLC, front contact *a* of relay PDKH, back contact *d* of relay PDB, the winding of relay PDKH and back contact *e* of relay TRA, relay PDKH having sufficient slow release time to bridge the transfer time of contact *d* of relay PDB. This circuit is effective to hold relay PDKH energized, and thus the storage relays K energized in whatever combination initially picked-up, as long as unit FLC is busy because of codes elsewhere in the remote control system. This retains the data information stored until such time as it can be transmitted to the office. When a code is transmitted from this station, data is transmitted because of the energy supplied over the various connections, each including front contact *b* of one storage relay K, to the internal circuitry of unit FLC. This action is conventional in such remote control systems and it is to be understood that the data received at the office is in keeping with the energized condition of the various storage relays.

Some of the coordination provided by my invention is illustrated by the operation of relays PDE, PDCL, PDB, and PDKH, as just described. It is to be noted that relay PDCL cannot be energized until relay PDE has picked up to close its front contacts. In general, the same conditions of data recall, reset, and/or delivery request must exist to complete the energizing circuits for each of these two relays. Relay PDCL is held energized over a back contact of relay PDKH while relay PDE is deenergized when the recall, reset, or delivery control relay releases. The energizing circuit for relay PDB is normally completed by the closing of a front contact of relay PDCL, this front contact being also included in the stick circuit. However, in addition, the energizing circuit for relay PDB also includes a multiple path over back contacts of relays PDE and PD. Since relay PDE, picked up to energize relay PDCL, has slow release characteristics, the back contact of relay PD is the ruling factor. Since, as will be explained later in describing the product flow counting, relay PD is picked up during a count entry, relay PDB cannot be energized to initiate the data readout into the storage relays K while a count entry is already in progress. Relay PDKH is energized over a front contact of relay PDB only if reset relay TRA is released. Relay PDKH, of course, completes the stick circuits for the already energized storage relays K, which hold the data readout actuated by relay PDB. Relay PDKH, upon picking up, also interrupts the stick and energizing circuits, respectively, for relays PDCL and PDB. Relay PDCL releases immediately and opens the stick circuit for relay PDB. Release of this latter relay frees relay PD and its repeater relay PDP, in a manner described later in connection with the counting circuits, to continue to drive the counting chain. Thus, coordination is obtained between the various actions which are part of the system of my invention.

Referring now to FIG. 4, I shall describe the circuits there illustrated for controlling the delivery of the pipeline product to a local customer at the station of FIG. 3. This product delivery is accomplished and controlled through the set point arrangement. Any set point control code from the office causes the energization of the set point delivery control relay SPDC. Although the specific control of this relay is not shown, it is to be understood that it may be controlled by a particular step in a preselected control code or that it may be a delivery control relay associated with the coding unit and actuated at the end of a separate set point control code. In any event, when relay SPDC is energized and picks-up, it completes a circuit for energizing the delivery command control relay DCC which is part of the arrangement provided by my invention. The circuit for energizing relay DCC is traced from terminal B over front contact *a* of relay SPDC, front contact *d* of delivery valve closed indication relay DVCK, back contact *b* of delivery-on control relay DNC, and the winding of relay DCC to terminal N. The closing of front contact *a* of relay DCC upon its energization bypasses back contact *b* of relay DNC in the energizing circuit to provide a stick circuit for relay DCC. Relays DVCK and DNC are normally picked-up and released, respectively, the positions in which they are shown in the drawing. Relay DVCK is normally energized over a contact closed by the delivery valve closed limit switch, that is, the switch actuated when the delivery valve is in its closed position which it normally occupies between periods of product delivery. Since product delivery is not the normal condition, delivery-on control relay DNC is thus normally deenergized, as will be more fully understood shortly, and its back contact remains closed.

The set point control code also causes the energization of the set point registry relays SPR which are associated with the remote control system. Only the contacts of this bank of relays are shown as their control is conventional and fully explained in my prior patent. Depending upon the set point quantity transmitted, various ones of these relays will be energized by the control code and their front contacts closed. These contacts are shown in vertical alignment at the extreme left of FIG. 4. Each relay SPR is repeated by a set point storage relay SP, eight of these relays being shown in FIG. 4, one for each of the front contacts of the SPR relays indicated. In the reference characters for relays SP, the numerical suffix represents the set point quantity in ten-barrel units of measure which it is desired to deliver. The set point is stored in these relays in decimal-binary code form, the same form in which the counting relays record the product flow as will be explained shortly. It is to be understood that the unit of measure in which the set point quantity is recorded may be as predetermined for the system in question, the ten-barrel unit here chosen as being for purposes of present explanation only and not a requirement of the system.

When relay SPDC is energized at the end of the set point control code, the SP relays are energized in accordance with the set point registered in the SPR relays. For example, if relay SPR17 has been energized, a circuit will exist from terminal B over the front contact of relay SPR17, front contact *f* of relay SPDC, and the winding of relay SP4 to terminal N. Relay SP4 thus picks-up to store a 40 barrel set point demand. Correspondingly, if relay SPR20 is energized, a circuit is completed including the front contact of relay SPR20, front contact *i* of relay SPDC, and the winding of relay SP80 to energize this latter relay to register an 800 barrel delivery demand set point. The total set point in this case would be the sum of the two SP relays energized, that is, 800 plus 40 or 840 barrels. When relay SPDC releases at the termination of the corresponding control code, stick circuits are completed for the energized SP relays including the back contact of relay SPDC corresponding to the front contact in the energizing circuit, front contact *a* of the SP relay itself, and back contact *a* of delivery reset relay DRS. As a specific example, the stick circuit for relay SP80 is traced from terminal B over back contact *a* of relay DRS, front contact *a* of relay SP80, back contact *i* of relay SPDC, and the winding of relay SP80 to terminal N. It is to be noted, as will be more fully described later, that relay DRS is energized to reset the set point storage bank to zero prior to the issuing of a new delivery command.

With any set point demand stored in the set point storage relays, the circuit is completed for energizing delivery-on relay DNC. For example, with the assumed set point of 840 barrels stored in the SP relay bank, a circuit exists from terminal B over front contacts b, in multiple, of relays SP4 and SP80, front contact c of the counter reset relay CRS, front contact e of relay DCC, the winding of relay DNC, front contact a of power off relay PO, and back contact a of delivery-off control relay DFC to terminal N. It is to be noted that counter reset relay CRS is energized at this time as shown in the lower right of FIG. 5 by the closing of front contact d of relay DCC. As will be apparent later, the pick-up of relay CRS resets the product delivery counting chain to its zero position to assure that the present delivery command will be measured from the zero condition. Thus, before delivery-on control relay DNC can be energized, the counter is reset to zero. Back contact a of relay DFC is included in the circuit to assure that no command for shutting off the delivery has been received at this station. Power off relay PO is a normally energized detector relay that assures, when energized, that the commercial alternating current power is available, use of this relay being conventional. It is shown simply, connected between the terminals BX and NX of the local alternating current source. Various well known arrangements are used for energizing such a relay to detect the presence of the alternating current power and any may be used in connection with the system of my invention. The closing of front contact a of relay DNC completes a stick circuit for this relay which will be traced shortly in connection with the set point matching contact matrix description. Front contact c of relay CRS opens shortly after the energization of relay DNC, but prior to this time, the stick circuit for this latter relay is effective. Relay CRS must release in order to permit the counting chain to record the flow of the product as it is delivered to the customer. The closing of front contact c of relay DNC energizes its repeater relay DNCP which is provided with slow release characteristics. A stick circuit is sometimes effective for relay DNCP including its own front contact a and back contact b of power off relay PO. Obviously, this stick circuit is effective only when the local alternating current power is not available so that relay PO is deenergized.

With alternating current power on and relays DCC and DNC both energized, a circuit is completed for opening the product delivery valve to initiate the delivery to the local customer. Only a portion of the valve circuit is shown, that portion which is involved in the arrangement provided by my invention. In the lower right of FIG. 4, for example, a circuit is now complete between lead 26 and lead 28, the open control connection for the delivery valve. This circuit path includes front contact c of relay PO, front contact d of relay DNC, and front contact f of relay DCC. This initiates the opening of the delivery valve. As soon as the valve begins to open, the simple circuit controlling relay DVCK is interrupted by the opening of the contact controlled by the delivery valve closed limit switch. Relay DVCK releases, closing its back contact a to energize the delivery valve open indication relay DVOK which picks-up. This causes the transmission of a valve open indication to the office over the remote control system, the indication circuit being actuated by the closing of front contact a of relay DVOK. The release of relay DVCK to open its front contact d also deenergizes relay DCC which, here shown as having slow release characteristics, retains its front contacts closed for a period of time. This assures that the delivery valve will fully open, front contact f of relay DCC remaining closed for a sufficient period to accomplish this action. It is to be understood that other means of establishing a delay period to assure full operation of the valve may be used. The delivery valve now remains open until a further control is applied to close the valve, that is, until a circuit is completed between lead 26 and lead 27, the closed control lead for the valve. This action will be discussed hereinafter.

As long as relay DNC remains energized so that its back contact d is open, the circuit can not be completed for closing the delivery valve. Relay DNC is held energized by its stick circuit which is completed in the set point matching matrix provided by the system of my invention. This matrix comprises contacts of the set point storage relays SP and contacts of the counter relays PD, which are shown in FIG. 5 and whose operation will be discussed hereinafter. With the establishment of a set point command in storage relays SP and the resetting of the counting relays PD to their zero position, a disagreement exists in the set point matching matrix and this disagreement condition is used to retain relay DNC energized. For example, under the assumed conditions of a set point demand for 840 barrels delivery, a circuit exists from terminal B over front contact c of relay SP4 and back contact e of relay PD4 in multiple with the path over front contact c of relay SP80 and back contact e of relay PD80, the circuit extending from this multiple connection over front contact a and the winding of relay DNC, front contact a of relay PO, and back contact of a of relay DFC to terminal N. Since the other SP relays are presently released, not being involved in the set point storage for 840 barrels, these two circuit paths are the ones of primary interest in the present description. It is obvious, however, from an inspection of the drawing, that, as the delivery count progresses, various other circuits will briefly exist to also supply energy for retaining relay DNC energized.

The delivery of the product to the customer is counted or recorded by the PD relay chain shown in FIG. 5, to be discussed later. However, when a delivery of 840 barrels is counted by this chain, agreement in the set point matching matrix is obtained. One of the two parallel paths previously traced through the matrix is interrupted by the opening of back contact e of relay PD80 when this relay is energized. The closing of the corresponding front contact does not complete any circuit. Shortly thereafter, the opening of back contact e of relay PD4 interrupts the other parallel path through the matrix and the stick circuit for relay DNC is interrupted. This relay, thus deenergized, releases. The opening of front contact c of relay DNC deenergizes relay DNCP, its repeater relay, but this latter relay, having slow release characteristics, holds its front contacts closed for a selected period of time. The circuit is now complete between lead 26 and lead 27 in the delivery valve control arrangement, the circuit being completed over front contact c of relay PO, back contact d of relay DNC, and front contact b of relay DNCP which is still closed at this time. The delivery valve is thus actuated to its closed position. Upon the release of relay DNCP at the end of its slow release period, the circuit is interrupted but the valve is in its closed position at this time.

In the matching matrix, the set point value and the delivery count are both held until a new delivery action is initiated at some later time, or with respect to the set point storage, a delivery reset action is accomplished to interrupt the stick circuits for the energized SP relays at back contact a of relay DRS. Relay DRS is energized, of course, upon the reception of a system reset control by the closing of front contacts b of relays R10 and R11, the circuit being further completed over back contact b of relay R12, front contact c of the common code delivery control relay 234DC, back contact e of relay DNC to assure that no delivery on command is in effect, and front contact e of relay DVCK to assure that the delivery valve is closed. Relay DRS remains energized for a relatively short period only, such timing being sufficient when taken in connection with the slow release characteristics of this relay for resetting the set point storage.

The product delivery may be halted short of the initial set point selected, or at any time in the action, by energizing the delivery-off control relay DFC. This relay may be energized by a control code from the office, the code being in the usual nature with steps 10 and 11 transmitted with long characteristics. Thus, the circuit for relay DFC is traced from terminal B over front contacts *b* of relays R10 and R11, back contact *b* of relay R12, front contact *d* of the delivery control relay DC, and the winding of relay DFC to terminal N. The opening of back contact *a* of relay DFC interrupts the stick circuit for relay DNC causing it to release to initiate the closing of the delivery valve. Relay DFC releases at the end of the control code, or shortly thereafter, to restore the circuit arrangement to its normal off condition.

The system of my invention also includes provisions for halting the delivery in the event that the alternating current power fails at the delivery station. The control of power off relay PO has already been briefly described In the event that alternating current power is interrupted, relay PO will release shortly thereafter, closing its back contact *b* to complete the stick circuit for holding relay DNCP energized. The opening of front contact *a* of relay PO interrupts the circuit for relay DNC which immediately releases. However, the opening of front contact *c* of relay PO interrupts the control arrangement for the delivery valve so that this valve can not be moved at this time. However, an auxiliary check valve closes immediately upon the failure of the alternating current power source, halting the delivery of the product to the customer. Upon the restoration of power, relay PO is energized and picks-up. This deenergizes relay DNCP by interrupting its stick circuit but this relay, previously described as having slow release characteristics, holds its front contacts closed for a selected period. Thus, the circuit is again complete between lead 26 and lead 27 in the delivery valve control arrangement, the portion shown being completed over front contact *c* of relay PO, back contact *d* of relay DNC, this relay remaining released since its circuit has been previously interrupted, and front contact *b* of relay DNCP which remains closed until the end of the slow release period of this relay. The delivery valve is thus actuated to its closed position to prevent further delivery of the product to the customer. Under these conditions, product delivery must be restarted by establishing a new set point to again initiate the opening of the delivery valve.

I shall now describe the operation of the counting arrangement shown in FIG. 5, with reference also to the timing chart for the counting chain shown in FIG. 6. The counting arrangement embodied in this form of my invention is divided into various digit portions, each portion representing or counting the corresponding digit in the decimal number measurement of the quantity of the product flow. In the specific arrangement of FIG. 5, only the units and tens digit portions are shown. When an additional quantity must be counted, other sections are added to the chain as required. Each portion or section of the counter consists of four counting relays designated by the general reference character PD and two stepping relays X and Y. In the two sections shown, the stepping relays for the tens digit section of the counter are designated by the reference characters 10X and 10Y while the relays for the units portion are merely designated relays X and Y. The suffix added to the general reference character PD to distinguish the various counting relays represents the equivalent count weight which that relay adds to the code arrangement in the decimal-binary code here used. Said in another way, when the binary number represented by the energized condition of the four counting relays in a section is to be translated into a decimal number, each energized relay is weighted in accordance with the numerical suffix in its reference character to accomplish the translational process.

The counting arrangement is driven by the positive displacement meter which measures the product flow in the pipeline. The actual control is affected by the meter contact shown within the dotted rectangle in the lower portion of FIG. 5, the rectangle being designated as the PD pulser. Counter contact PDC within this pulsing arrangement is driven by the meter to periodically close as each unit of measure of the product passes the meter location. It has been herein assumed, previously, that the unit of measure of 10 barrels is to be used in the present arrangement, although the system is not limited to such a unit of measure. The key switch shown within the dotted rectangle is used to halt the driving of the counting arrangement by the meter in the event that it is desired to actuate the counting chain by manual operation of the local pushbuttons shown immediately below the pulser. One such spring return pushbutton is provided for each section of the counting chain and one for reset action. They are intended to be operated manually with each operation entering a single count into the corresponding section of the chain. It is believed that this manner of operation and control will become apparent from the description of the counting chain given in connection with its usual operation.

Each closure of contact PDC energizes the positive displacement relay PD by completing the circuit through the upper winding of this relay. Relay PD is provided with a repeater relay PDP which is of the magnetic stick type having two windings. This type of relay has the characteristic that, when either or both of its windings is energized by current flowing in the direction of the arrow shown within the winding symbol, the relay contacts are operated to close in the left hand or normal position. If the flow of current through either or both windings is in the direction opposite to the arrows shown therein, the relay contacts are operated to close in their right hand or reverse position. When relay is deenergized, the contacts remain in the position to which they were last operated. Relay PDP is provided with two operating circuits. The first circuit, including its upper winding, further includes front contact *b* of relay PD and back contact *d* of relay PDB. It is obvious that the flow of current in this circuit is in the direction of the arrow in the upper winding, thus the contacts of relay PDP will close in their normal position. The other circuit, including the lower winding of relay PDP, further includes back contact *b* of relay PD and back contact *d* of relay PDB. The flow of current in this circuit is in the direction opposite to the arrow in the lower winding and thus the contacts of relay PDP will be operated to close in their reverse portion when this circuit is effective. It is obvious that relay PDP alternately operates its contacts between the normal and reverse positions as relay PD is energized and deenergized, respectively, by the operation of contact PDC.

If a readout request is received by this station, circuits for relay PDP are interrupted at back contact *d* of relay PDB. It has been previously explained that this relay is energized in response to the reception of a readout request. It is to be noted that relay PD is provided with a stick circuit which includes its lower winding and front contact *a*, back contact *a* of a bus repeater relay PDBP, reverse contact *b* of relay PDP and the normally closed contacts *a* of the pushbuttons 1PB, 10PB, and 0PB. A special stick circuit is also provided for relay PD which holds this relay and thus retains a count while readout operation is occurring. This stick circuit includes the lower winding and front contact *a* of relay PD and front contact *a* of relay PDBP. This latter relay is energized by the simple circuit including front contact *d* of relay PDB which is energized during readout operation. It is to be remembered that back contact *c* of relay PD is also included in an energizing circuit for relay PDB to further coordinate the readout and counting actions at this station.

I shall now assume that, with the counting chains in their zero condition, that is, all relays released, contact PDC closes to initiate a new count. The closing of contact PDC energizes the upper winding of relay PD and this relay picks-up to close its front contacts. The closing of front contact $b$ of relay PD completes the circuit for energizing the upper winding of relay PDP, causing this relay to operate its contacts to close in the normal position. The circuit is now completed for energizing counting relay PD1 in the units section of the counting arrangement. This circuit is traced from terminal B over the normally closed contacts $a$ of the three pushbuttons, normal contact $a$ of relay PDP, back contacts $b$ of relays Y and X, the winding of relay PD1, bus 24, back contact $e$ of relay 10Y, back contact $f$ of relay 10X, back contact $c$ of relay PD10, bus 25, and back contact $b$ of relay CRS to terminal N. Thus energized, relay PD1 picks-up to close its front contacts. It is to be here noted that during the counting of the first nine closures of contact PDC, no change occurs in any of the relays of the second or tens digit section of the counter arrangement. Therefore, bus 24 may be considered for this period as an equivalent of terminal N of the local source.

When contact PDC opens shortly thereafter, relay PD is deenergized and releases, its stick circuit being interrupted at reverse contact $b$ of relay PDP. The closing of back contact $b$ of relay PD energizes the lower winding of relay PDP which operates its contacts to close in the reverse position. Relay PD1 is held energized at this time by a stick circuit which includes its own front contact $a$, back contact $b$ of relay PD2, and back contact $c$ of relay Y. With the reverse contacts of relay PDP closed, the circuit is now complete for energizing relay X. This circuit includes the normally closed contacts $a$ of the pushbuttons, reverse contact $b$ of relay PDP, front contact $b$ of relay PD1, back contact $c$ of relay PD2, and the upper winding of relay X. Relay X, thus energized, picks up to close its front contacts. Contact PDC again closes to indicate the passage of the second unit of measure of the product through the pipeline and relays PD and PDP are energized in the fashion previously described. The closing of normal contact $a$ of relay PDP now completes the circuit for energizing relay PD2, the circuit further including back contact $b$ of relay Y, front contact $b$ of relay X, back contact $b$ of relay PD8, and the winding of relay PD2 to bus 24. Relay X is held energized at this time by a stick circuit including the normally closed contacts $a$ of the pushbuttons, normal contact $b$ of relay PDP, and front contact $a$ and the lower winding of relay X. When relay PD2 picks up, it closes its front contact $b$ in place of that back contact, thus interrupting the stick circuit for relay PD1, the circuit over front contact $c$ of relay X being open at front contact $d$ of relay Y. Relay PD1, thus deenergized, immediately releases. When contact PDC shortly opens, relay PD again releases and relay PDP operates its contacts to their reverse position. The energizing circuit for relay PD2 is now interrupted but this relay is held energized by a stick circuit including its own front contact $a$ and back contacts $a$ of relays PD4 and PD8. The stick circuit for relay X is interrupted at normal contact $b$ of relay PDP, and since its energizing circuit is now opened at front contact $b$ of relay PD1, relay X is deenergized and releases.

When contact PDC closes for the third count, relay PD1 is again energized, the circuit including normal contact $a$ of relay PDP and back contacts $b$ of relays Y and X. Relay PD2 is held energized over its previously traced stick circuit and this third count has no effect on this relay. Relays PD1 and PD2 are thus both energized and picked-up at this time to give, in binary form, the count of three. It may be noted that this count is also the sum of the numerical suffixes of the reference characters of the relays which are energized. When contact PDC opens and relay PDP is operated to its reverse position relay PD1 is held energized by a second stick circuit including its own front contact $a$, front contact $b$ of relay PD2, back contact $c$ of relay X, and back contact $b$ of relay PD4. With the closing of reverse contacts of relay PDP, a circuit is completed for energizing relay Y including reverse contact $b$ of relay PDP, front contact $b$ of relay PD1, front contact $c$ of relay PD2, and the upper winding of relay Y. Thus energized, relay Y picks-up, closing its front contacts.

When contact PDC next closes, the circuit is completed for energizing relay PD4. This circuit includes, in part, normal contact $a$ of relay PDP, front contact $b$ of relay Y, and back contact $e$ of relay X. Relay PD4, thus energized, picks-up and completes a stick circuit including its own front contact $a$ and back contact $a$ of relay PD8. The opening of back contact $a$ of relay PD4, since back contact $d$ of relay Y is already open, interrupts the stick circuit for relay PD2 which is thus deenergized and releases. The opening of back contact $b$ of relay PD4 interrupts the existing stick circuit for relay PD1 and, with back contact $c$ of relay Y open, the closing of front contact $b$ of relay PD4 can not complete any other stick circuit, so PD1 is deenergized and also releases. With normal contact $b$ of relay PDP closed, relay Y is held energized by a stick circuit also including its own front contact $a$ and lower winding. However, at the end of the count, when contact PDC again opens and relay PDP operates its contacts to the reverse position, the stick circuit for relay Y is interrupted at normal contact $b$ of relay PDP and the energizing circuit for the upper winding of relay Y is interrupted at front contact $b$ of relay PD1 as well as front contact $c$ of relay PD2. At this time, that is, at the end of count 4, relay Y is deenergized and releases.

When the next count is entered by the successive closing of contact PDC, the circuit is again completed for energizing relay PD1. The circuit, previously traced, includes normal contact $a$ of relay PDP and back contacts $b$ of relays Y and X. The stick circuit for relay PD4 remains effective so that the condition in this section of the counting chain is now with relays PD1 and PD4 energized and picked up. This condition represents the binary equivalent of the decimal number 5, the translation being the sum of the numerical suffixes of the energized relays or 5. When the count ends, relay PD1 is held energized by its original stick circuit including its own front contact $a$ and back contacts $b$ and $c$ of relays PD2 and Y, respectively. The closing of reverse contact $b$ of relay PDP energizes the upper winding of relay X, the circuit further including front contact $b$ of relay PD1 and front contact $c$ of relay PD4 in multiple with back contact $c$ of relay PD2.

The entry of the next count causes the energization again of relay PD2, the circuit including back contact $b$ of relay PD8, front contact $b$ of relay X and back contact $b$ of relay Y. Relay X is held energized by the stick circuit including its own lower winding and front contact $a$ and normal contact $b$ of relay PDP. The stick circuit for relay PD1 is interrupted at back contact $b$ of relay PD2 and the circuit over the corresponding front contact is interrupted at front contact $d$ of relay Y so that relay PD1 is deenergized and releases. This section of the counting chain is now in condition representing the binary equivalent of number 6, i.e., the sum of suffixes 4 and 2. Relay X is held energized until contact PDC opens to cause the operation of relay PDP to its reverse position. This interrupts the stick circuit for relay X and its energizing circuit also open, the relay is deenergized and releases. Relay PD2 is held energized at this time by a second stick circuit including its own front contact $a$, back contact $d$ of relay Y, and back contact $a$ of relay PD8.

The entry of the 7th count occurs with both relays X and Y released so that relay PD1 is again energized over the circuit previously traced. Relays PD4 and PD2 continue to be held energized over their stick circuits. At the end of the count, the closing of reverse contact $b$ of relay PDP completes the circuit for energizing both relay X and relay Y. The circuit further includes front contact *b* of relay PD1 and, for relay Y, front contact *c* of relay PD2, and for relay X, front contact *c* of relay PD4. Relays Y and X, thus energized, pick up and the stick circuits for the counting relays are readjusted to hold them energized at this time. Actually, there is no change in the stick circuit for relay PD4. However, the stick circuit for relay PD2 now includes its own front contact *a*, front contact *d* of relay X, and back contact *a* of relay PD8. The existing stick circuit for relay PD1 includes its own front contact *a*, front contact *b* of relay PD2, front contact *c* of relay X, front contact *d* of relay Y, and back contact *a* of relay PD8. Since contacts *d* of both relay X and relay Y are of the continuity transfer type, the shift in the stick circuit for relay PD2 with the simultaneous energization of relays X and Y occurs without interrupting the energization of the winding of relay PD2 so that this relay remains in its picked up condition. The same condition holds true for relay PD1 as an initial stick circuit under these conditions exists over back contacts *c* of relays X and Y and front contacts *b* of relays PD2 and PD4. As relays X and Y pick up, the continuity transfer contact arrangement assures the continued energization of relay PD1 so that it will not release under these conditions.

When contact PDC closes for the 8th count, the circuit is completed for energizing relay PD8, this circuit including normal contact *a* of relay PDP and front contacts *b* and *e*, respectively, of relays Y and X. Relay PD8 picks up, closing its own front contact *a* to complete a stick circuit through the relay winding to bus 24. The opening of back contact *a* of relay PD8 interrupts all of the existing stick circuits for relays PD1, PD2, and PD4. These relays, thus deenergized, immediately release. At the beginning of this count, relays Y and X are held energized by stick circuits completed at normal contact *b* of relay PDP. At the end of the count, however, when this normal contact is open, relays Y and X are deenergized since their energizing circuits are also interrupted at contacts of other counting relays, and the stepping relays release at this time.

When the 9th count begins, the circuit previously traced is again complete for energizing relay PD1 which picks up, closing its own front contact *a* to complete the stick circuit further including back contacts *b* and *c* of relays PD2 and Y, respectively. The relays are thus now in the condition for the binary equivalent of the numeral 9, the translation being the sum of suffixes 8 and 1. At the end of this 9th count when relay PDP again operates to its reverse position, the previously traced circuit including reverse contact *b* of relay PDP and front contact *b* of relay PD1 is completed for energizing relay X through its upper winding. This relay picks up at this time.

When the 10th count occurs and relay PDP operates to its normal position, the circuit is completed for energizing the first relay in the next digit section of the counting arrangement, the relay PD10. This circuit may be traced over the normally closed contacts *a* of the manual pushbuttons, normal contact *a* of relay PDP, back contact *b* of relay Y, front contact *b* of relay X, front contact *b* of relay PD8, back contacts *b* of relays 10Y and 10X, the winding of relay PD10, bus 25, and back contact *b* of relay CRS to terminal N. It may be noted that the open back contact *b* of relay PD8 interrupts the energizing circuit for relay PD2 which thus is not energized at this time. The opening of back contact *c* of relay PD10 interrupts the connection from bus 24 to bus 25 and thus to terminal N, so that relays PD8 and PD1 are deenergized by this interruption of the existing stick circuits and these relays release. At the end of this 10th count, the opening of normal contact *b* of relay PDP interrupts the stick circuit for relay X and since its energizing circuit is open at front contact *b* of relay PD1, relay X releases. At the same time, the closing of reverse contact *b* of relay PDP completes the circuit further including front contact *b* of relay PD10, back contact *c* of relay PD20, and the upper winding of relay 10X for energizing this latter relay, which then picks up. Relay PD10 is held energized by its stick circuit which includes its own front contact *a* and winding, back contacts *b* and C of relays PD20 and 10Y, respectively, bus 25, and back contact *b* of relay CRS. It is apparent that this stick circuit remains effective as long as relay PD20 is not energized so that relay PD10 is held energized during the entry into the system of the next 10 counts by the PD meter. Likewise, relay 10X is held energized alternately by its energizing circuit just traced and by its stick circuit which includes normal contact *b* of relay PDP and front contact *a* and the lower winding of relay 10X. These circuits are effective to hold relay 10X energized during the next 10 counts, the operation of relay PDP between its normal and reverse positions being sufficiently fast to retain relay 10X in its picked up position. At the end of the 10th count, then, relay PD10 is energized, signifying the entry of a single count into the tens digit section of the decimal-binary counting arrangement, and all of the relays in the units digit section are released.

The next operation of contact PDC initiates a new cycle of operation in the unit section of the counting chain. As previously explained, relay PDP operates to its normal position and the circuit including normal contact *a* of that relay and back contacts *b* of relays Y and X is completed for energizing relay PD1. No circuit exists into the tens digit section of the counting arrangement so that no action occurs in this portion of the chain, the stick circuits holding relays PD10 and 10X energized. At the end of the count relay PD1 is held energized by the stick circuit including its own front contact *a* and back contacts *b* and *c* of relays PD2 and Y, respectively. The connection from bus 24 to bus 25 and thus to terminal N at back contact *b* of relay CRS at this time includes back contact *e* of relay 10Y, front contact *f* of relay 10X, and front contact *c* of relay PD10. This circuit path remains in effect throughout the next nine counts entered into the unit section of the counting arrangement. Referring to the timing chart of FIG. 6, it may be seen, by extending the action illustrated for the units section relays to the relays for the tens section, that, when relay PD10 releases at the end of the second 10 counts, relay 10X will also release. This action is similar to that shown for relays PD1 and X at the end of second count. The path between bus 24 and bus 25 will then be reconstituted over the back contacts as originally traced. At other times, however, the circuit path between bus 24 and bus 25 will include front contact *e* of relay 10Y and front contact *c* of relay PD10.

The condition now existing in the arrangement provides a count of 1 in the tens digit position with relay PD10 energized and a count of 1 in the units digit position with relay PD1 energized. Thus a count of 11 is signified by the condition of the counting arrangement. When the next count occurs and relay PDP closes its normal contact *a*, a circuit is completed for energizing relay PD2, further including back contact *b* of relay Y, front contact *b* of relay X, now closed, and back contact *b* of relay PD8. At the end of this count, relay X is deenergized and releases, relay PD2 holding energized over the stick circuit including its own front contact *a* and back contacts *a* of relays PD4 and PD8. The stick circuit for relay PD1 is interrupted at back contact *b* of relay PD2 and this relay releases at the end of this 12th count. The cycle of operation through the units digit section of the counting arrangement continues, each count representing 10 plus the unit digit count. It is believed unnecessary to continue further in this description since the action of the units digit portion is identical with that described during the first 10 counts.

If a decimal count of 99 is exceeded by the two section counting arrangement illustrated, the system of my invention provides for resetting the chain to its zero condition so that the counting action may be repeated. Referring in FIG. 6 to the detailed time chart of the unit section operation and extending the action to the tens section, it is apparent that, upon completion of count 99, relays PD1, PD8, and X in the units digit section, and relays PD10, PD80, and 10X in the tens digit section, are energized. Upon the operation of relay PDP to its normal position with the entry of the next count by contact PDC, relays X and 10X are retained energized by their previously traced stick circuits. A circuit is also completed for energizing relay CRS, including normal contact $a$ of relay PDP, back contact $b$ of relay Y, front contacts $b$ of relays X and PD8, back contact $b$ of relay 10Y, front contacts $b$ of relays 10X and PD80, and the winding of relay CRS. This relay picks up, completing a stick circuit including its own front contact $a$ and normal contact $b$ of relay PDP. The opening of back contact $b$ of relay CRS interrupts the connection from bus 25 to terminal N, and thus interrupts the stick circuits of all energized counting relays. These relays release to indicate a zero count (here the equivalent of 100). When contact PDC opens and relay PDP returns to its reverse position, relays X, 10X, and CRS are deenergized by the opening of their stick circuits. Relay CRS is also energized the reset the counting relays when either relay DCC or relay DRS is energized, the circuits including front contact $d$ of each relay. A final circuit for relay CRS includes back contact $d$ of relay PDB, front contact $b$ of relay PDBP, and front contact $b$ of relay TRC. When a reset request control is received, as indicated by relay TRC being energized, the actual reset action, i.e., relay CRS energized, is thus delayed until the data readout is accomplished by relay PDB. Completion of this action is assured by front contact $b$ of relay PDBP being closed when back contact $d$ of relay PDB recloses.

It is obvious therefore that the counting arrangement above described provides a binary count for each digit of the decimal number representing the product flow or delivery. The total result is a decimal-binary code represented by the energized relays in each digit portion of the number. The weight of the energized relays, taken from the numerical suffix of the reference character, can be added to obtain the resultant value of the count, each digit being read in the usual order. The decimal-binary code allows an accurate and simple transmission of the flow data to the control office over the remote control system. Each binary number position is a separate code step in the indication code. The binary 1 or 0, that is, the corresponding counting relay picked up or released, is characterized by the long or short code step character, respectively. Contacts of the counting relays used for this purpose and for purpose of the set point matching matrix have already been discussed elsewhere in this specification.

It is to be seen therefore that the system herein described provides a coordination and control between product measuring and information reporting in a pipeline system equipped with a remote control arrangement for operating the pipeline. Data readout from the remote locations can be initiated without losing a count in the measured amount of product flow. Readout and counting are also coordinated to avoid ambiguous information being transmitted to the office as a result of counts being entered while readout is occurring. At the same time, product flow is recorded in a form which is transmitted simply and accurately over the remote control system in use. The product recorders and counters used for measuring the information can be reset as desired by the remotely located operator, either system-wise or at individual locations. Finally, product delivery to the customers at the various remote stations can be controlled, that is, initiated and stopped, with only a single action required of the system operator. For this purpose, the system operator need only transmit a set point quantity which indicates the amount of the product to be delivered. Reception of this information at the selected field location automatically controls the delivery action to the final closing of the valve when the desired amount has been delivered. The system embodying my invention thus adds to the efficiency of the operation of pipeline systems.

Although I have herein shown and described but one form of the pipeline metering and product delivery control system embodying my invention, it is to be understood that various changes and modifications may be made to the described system within the scope of the appended claims without departing from the spirit and scope of my invention.

Having thus described my invention, what I claim is:

1. In combination with a remote control system for operating a product pipeline installation having a control office and at least one remote station, a counting means at said station, a measurement means at said station responsive to the product flow in a selected portion of said pipeline and having connections for driving said counting means to record that flow, a normally closed valve connecting said selected portion to the remainder of said pipeline, readout means at said station having connections to said counting means for initiating when actuated transmission of the existing flow data to said office over said remote control system, recording means at said office controlled by said remote control system for receiving and recording the flow data from said station, reset means at said station having connections when actuated for resetting said counting means to its zero condition, a set point means at said station for establishing a desired quantity of said product for delivery, a first control means at said office having connections over said remote control system to said set point means for selecting a desired quantity, a valve control means responsive jointly to said first control means and to said set point means for opening the valve to said selected portion of said pipeline when a set point quantity is selected, a second control means at said office having connections over said remote control system for at times actuating said readout means, a third control means at said office having connections over said remote control system for at times actuating said reset means and said readout means, coordination circuit means at said station responsive jointly to the actuation of said readout means, and to the operation of said counting means for coordinating the transmission of flow data to said office and the recording of the product flow in said counting means to eliminate the recording and transmission of incorrect information, and matching means at said station jointly responsive to said set point means and to said counting means for detecting agreement and disagreement between the selected and counted quantities, said matching means controlling said valve control means for actuating the closing of said valve when agreement is detected.

2. In combination with a remote control system for operating a product pipeline installation having a control office and at least one remote station, said remote control system being capable of transmitting control and indication functions between said office and said station, a digital counter means at said station, a meter at said station responsive to the product flow in a selected portion of said pipeline for measuring the passage of each preselected unit of said product, a drive circuit controlled by said meter and having connections for recording each measured unit of said product in said counter means, a set point storage bank at said station for establishing a desired quantity of said product, the desired quantity being stored in the same form as the recorded quantity in said counter means, a first control means at said office having connections to said set point bank including said remote control system for selecting a particular desired quantity, a delivery means operable to a first and a second position for effecting and halting respectively the delivery of said product into said selected portion of the pipeline, a control circuit at said station controlled by said first control means and by said set point bank for operating said delivery means to its first condition when a desired quantity is stored, readout means at said station effective when actuated for initiating the transmission of the existing product flow record in said counter means over said remote control system, a recording means at said office controlled by said remote control system for receiving and recording the product flow record transmitted from said station, a reset means at said station effective when actuated for resetting said counter means to its zero position, a second and a third control means at said office having connections including said remote control systems for at times individually actuating said readout means and said reset means respectively, said third control means also initiating the actuating of said readout means, coordination circuit means at said station responsive jointly to the actuation of said readout means and to the operation of said drive circuit for delaying the transmission of the flow record when a measured unit is being recorded in said counter means and for storing a measured unit until said readout means has completed the initiation of a transmission, a quantity matching means at said station jointly controlled by said set point bank and by said counter means for detecting agreement and disagreement between the desired quantity stored in said set point bank and the quantity recorded in said counter means, and another control circuit controlled by said matching means for operating said delivery means to its second condition only when agreement is detected.

3. In combination with a remote control system for operating a product pipeline installation having a control office and at least one remote station, a counting means at said station, a measurement means at said station responsive to the product flow in said pipeline and having connections for driving said counting means to record that flow, readout means at said station having connections to said counting means for initiating when actuated transmission of the existing flow data to said office over said remote control system, recording means at said office controlled by said remote control system for receiving and recording the flow data from said station, reset means at said station having connections when actuated for resetting said counting means to its zero condition, a first control means at said office having connections over said remote control system for at times actuating said readout means, a second control means at said office having connections over said remote control system for at times actuating said reset means and said readout means, and coordination circuit means at said station responsive jointly to the actuation of said readout means and to the operation of said counting means for coordinating the transmission of flow data to said office and the recording of the product flow in said counting means to eliminate the recording and transmission of incorrect information.

4. In combination with a remote control system for operating a product pipeline installation having a control office and at least one remote station, said remote control system being capable of transmitting control and indication functions between said office and said station, a digital counter means at said station, a meter at said station responsive to the product flow in said pipeline for measuring the passage of each pre-selected unit of said product, a drive circuit controlled by said meter and having connections for recording each measured unit of said product in said counter means, readout means at said station effective when actuated for initiating the transmission of the existing product flow record in said counter means over said remote control system, a recording means at said office controlled by said remote control system for receiving and recording the product flow record transmitted from said station, a reset means at said station effective when actuated for resetting said counter means to its zero position, a first and a second control means at said office having connections including said remote control systems for at times individually actuating said readout means and said reset means respectively, said second control means having other connections for also actuating said readout means, and coordination circuit means at said station responsive jointly to the actuation of said readout means and to the operation of said drive circuit for at times delaying the transmission of the flow record when a measured unit is being recorded in said counter means and for at other times storing a measured unit until said readout means has completed the initiation of a transmission.

5. In combination with a remote control system for operating a product pipeline installation having a control office and at least one remote station, a digital counter at said station responsive to the flow of the product in said pipeline for recording the passage of each preselected unit of said product, a set point storage bank at said station for establishing a desired quantity of said product, the desired quantity being stored in the same digital form as the recorded quantity in said counter, a control means having connections to said set point storage bank including said remote control system for storing a desired quantity, a delivery means operable to a first and a second condition for effecting and halting respectively the delivery of said product, a control circuit controlled by said set point bank for operating said delivery means to its first condition when a desired quantity is stored, a matching means at said station jointly controlled by said set point bank and by said counter for detecting agreement and disagreement between the desired quantity stored and the quantity of said product recorded by said counter, and a second control circuit controlled by said matching means for operating said delivery means to its second position only when agreement is detected.

References Cited in the file of this patent

UNITED STATES PATENTS

| | | |
|---|---|---|
| 2,540,617 | Hazard et al. | Feb. 6, 1951 |
| 2,661,122 | Peterson | Dec. 1, 1953 |
| 2,759,633 | Ross | Aug. 21, 1956 |
| 2,942,159 | Polley | June 21, 1960 |
| 2,954,511 | Jackel | Sept. 27, 1960 |